United States Patent [19]

Young et al.

[11] Patent Number: 5,027,068
[45] Date of Patent: Jun. 25, 1991

[54] APPARATUS FOR MEASURING THICKNESS OF A NON-METALLIC LAYER ON A FERROMAGNETIC BASE MATERIAL

[76] Inventors: Douglas J. Young, P.O. Box 1113; Shawn C. Williams, Rte. 52 W., both of Liberty, N.Y., of 12754

[21] Appl. No.: 541,321
[22] Filed: Jun. 21, 1990
[51] Int. Cl.⁵ .................. G01B 7/10; G01R 33/12
[52] U.S. Cl. ................................. 324/229
[58] Field of Search .............. 324/229, 230, 231; 33/837

[56] References Cited
FOREIGN PATENT DOCUMENTS
907721 10/1962 United Kingdom ............ 324/230

Primary Examiner—Walter E. Snow
Attorney, Agent, or Firm—Leon Gilden

[57] ABSTRACT

An apparatus for the detection of body filler components utilized in damage repair of automotive sheet metal is set forth. The device utilizes an elongate housing including a reciprocatable shaft mounted coaxially within the housing, wherein the reciprocatable shaft includes a forward terminal end mounting a magnet member thereon. Upon the magnet being retracted relative to a non-metallic or filled body surfaces utilizing various polymeric or even lead fillers, the shaft remains retracted in the housing biased therewithin. Intermediate levels of body filler effects various degrees of extension of the shaft relative to the housing, wherein a stepped plate is provided to lock the shaft in its extension relative to the housing.

6 Claims, 6 Drawing Sheets

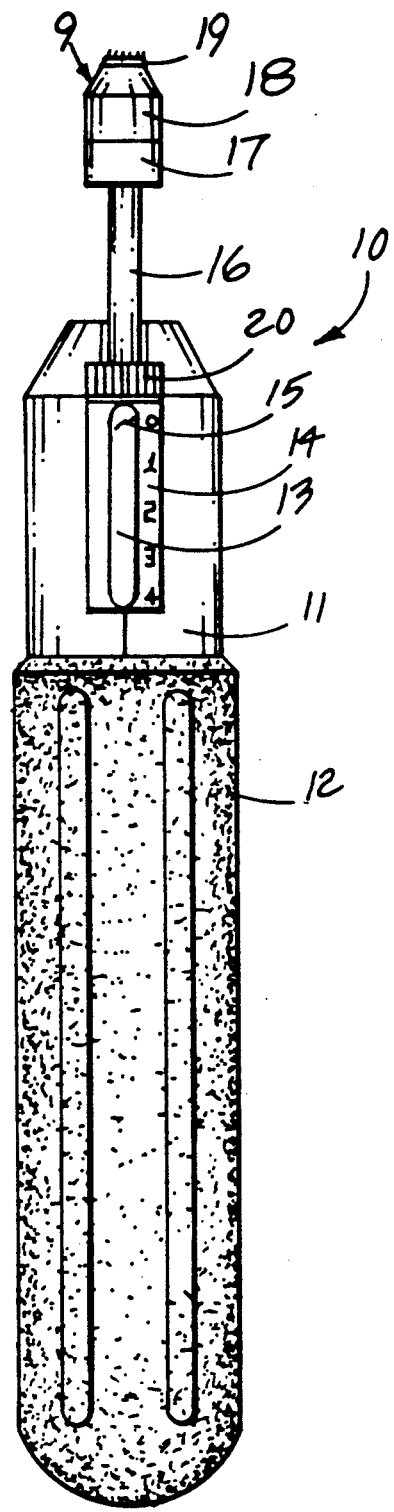

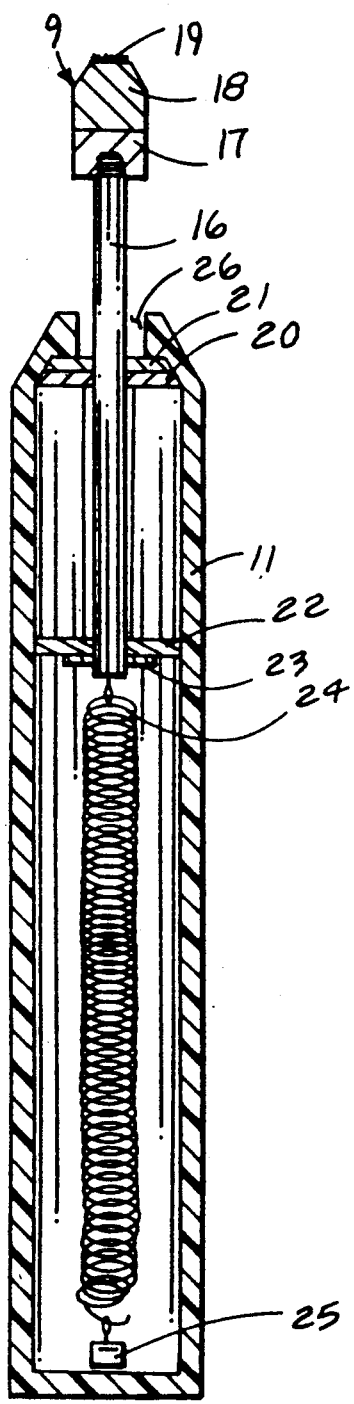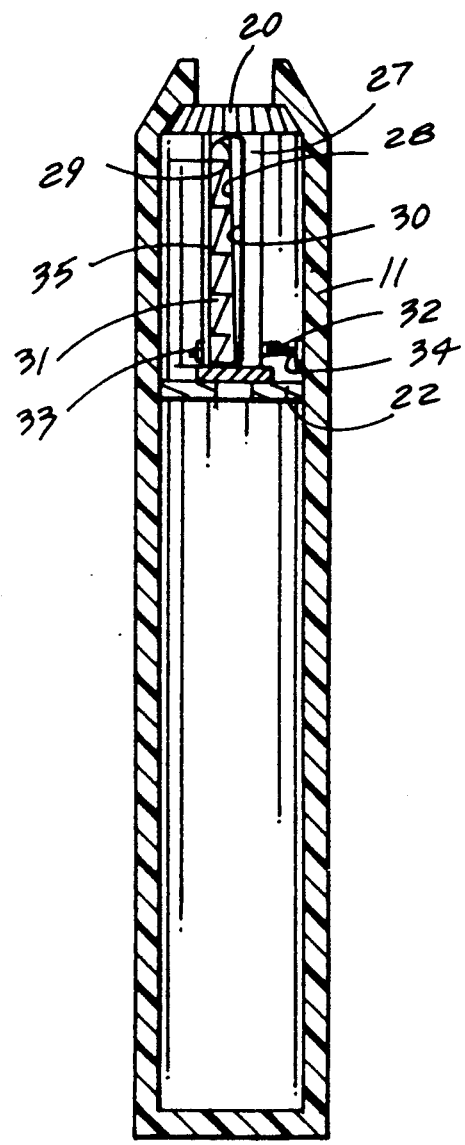

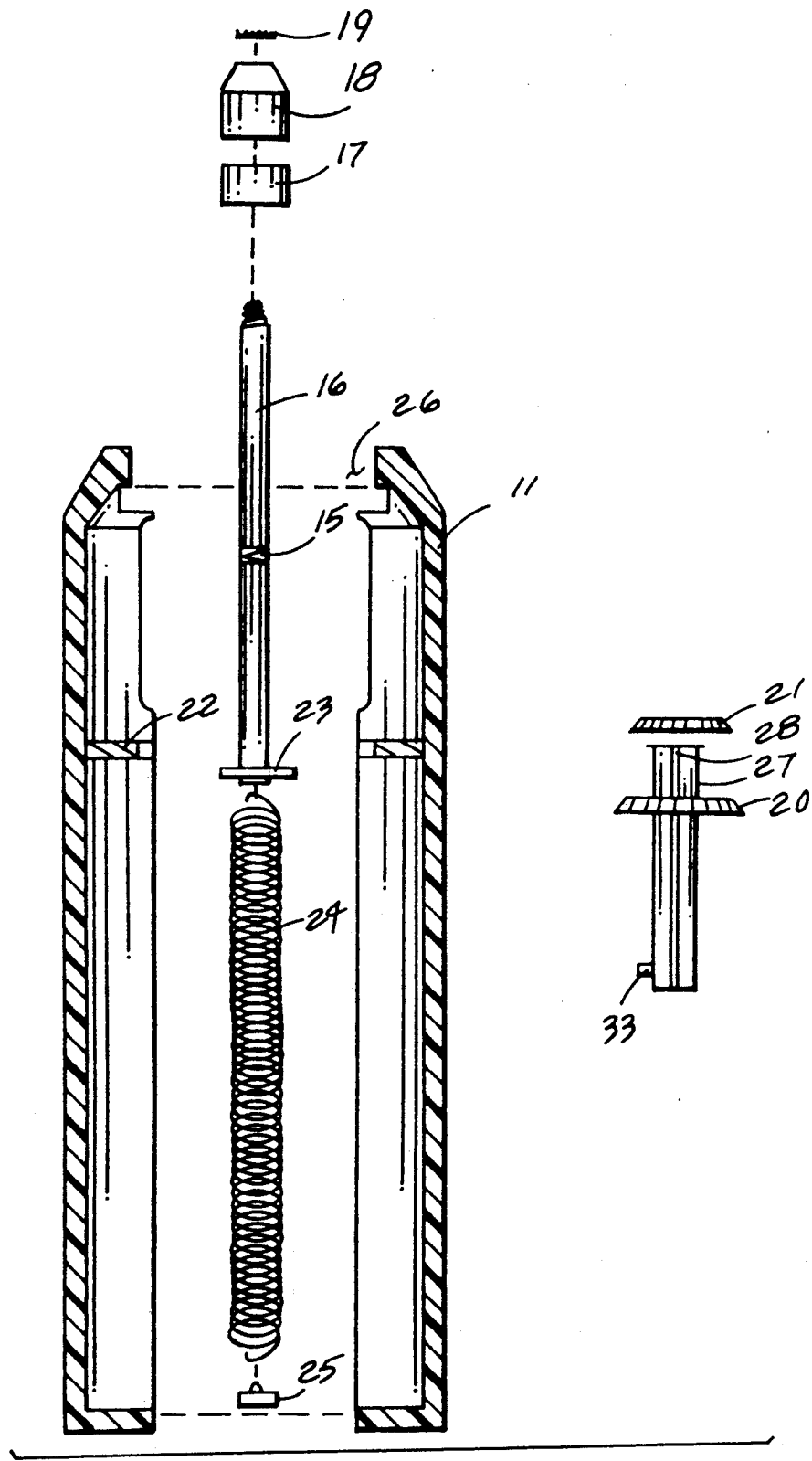

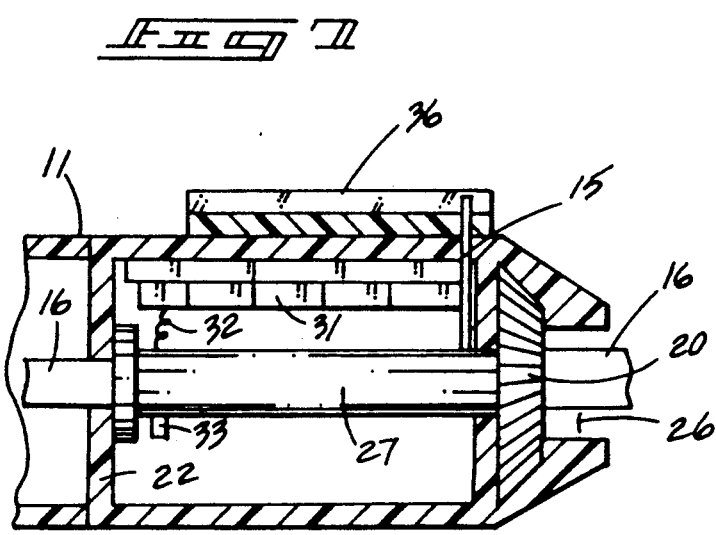
Fig 7
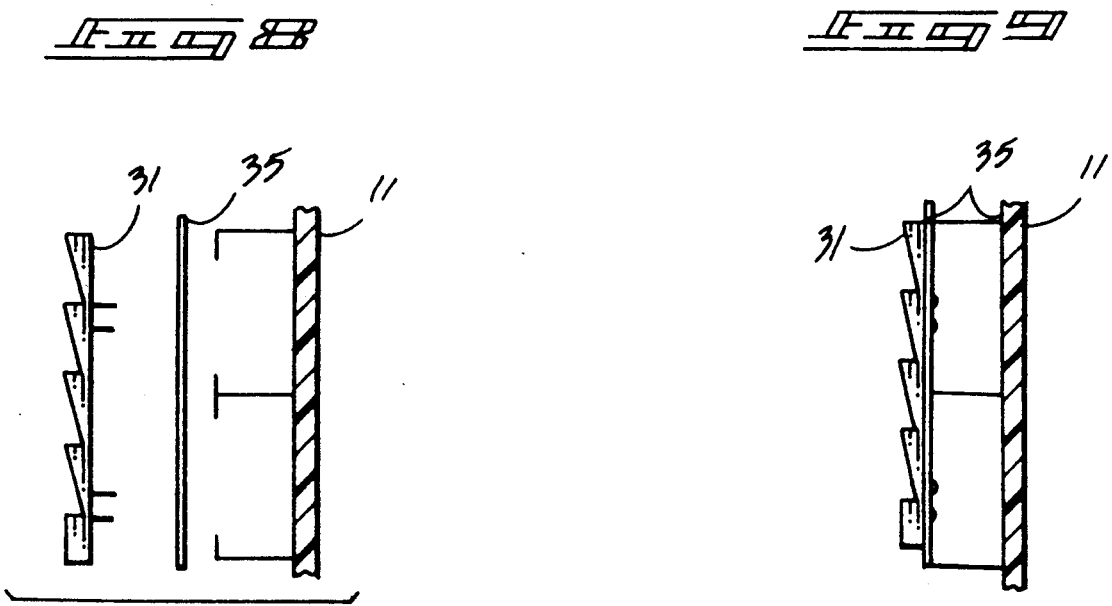
Fig 8
Fig 9

Fig. 10
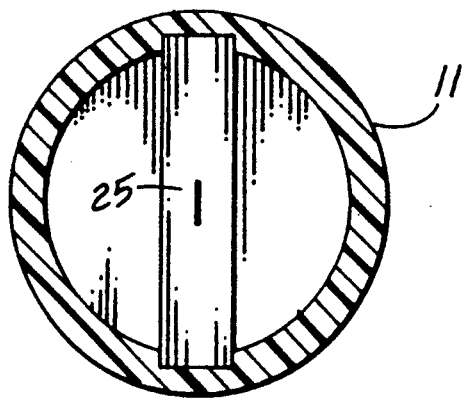
Fig. 11
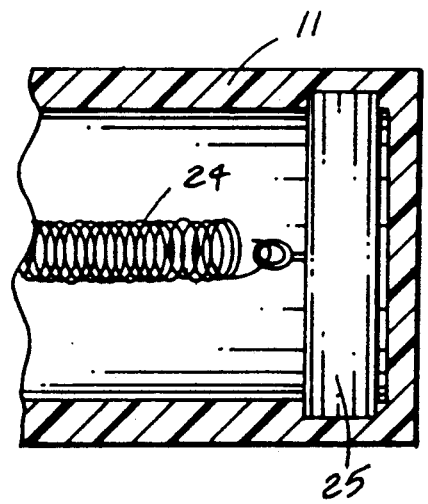
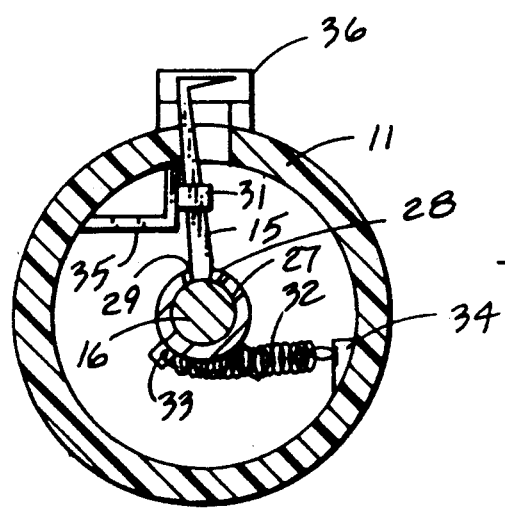
Fig. 12

APPARATUS FOR MEASURING THICKNESS OF A NON-METALLIC LAYER ON A FERROMAGNETIC BASE MATERIAL

BACKGROUND OF THE INVENTION

1. Field of the Invention

The field of the invention relates to detection apparatus, and more particularly pertains to a new and improved automotive body filler detection apparatus wherein the same is arranged to detect and visibly evidence various degrees of body filler of a non-ferrous steel character positioned within an automotive surface.

2. Description of the Prior Art

Restoration and repair of automotive body surfaces is a well knoWn expedient in the art. The advent of escalating costs of various classes of vehicles that have been restored to various levels of marketable condition is an activity that is currently of great interest. In the purchase of such vehicles, various paint and the like will mask any extreme damage or various levels of damage of an automobile and as such, body filler components are visibly non-detectable blending in with the geometric shape of an associated vehicle. In order to detect such body filler components, a purchaser is required to visibly inspect with associated limitations, for such availability of body filler within an automobile body surface. Application of a magnet to a body surface may be utilized, but the application of such a magnet does not provide indication of degrees of such body filler components. A minimal use of body filler does not appreciably detract from the value of an automobile, but it is desirable for an individual to ascertain various levels of such body filler and its thickness to ascertain associated value and integrity of various automobiles, particularly those of a "classic" designation.

Various detectors of metallic components have utilized the prior art. For example U.S. Pat. No. 4,727,322 to Lonchampt, et al. sets forth an organization for measuring a thickness of a test part utilizing eddy current, but of a relatively elaborate and complex organization not readily available for portable transport by an individual.

U.S. Pat. No. 4,779,352 to Lang provides an apparatus for measuring a thickness of a coating layer on an automobile by directing the probe associated with the apparatus along the surface of the automobile and moving the probe in coordination with the body of the automobile for a specific period of time.

U.S. Pat. No. 4,771,238 to Caruso, et al. sets forth a device for measuring thickness of metallic material without contact with the metallic materials, wherein a magnetic core with pole pieces and an electrical coil is wrought about a body of the core, wherein the coil is associated with a sinusoidal generator and wherein a processor develops information received from the organization directing determination based upon a measured value of impedance.

U.S. Pat. No. 4,555,665 to Stanley utilizing a magnetic flux positioned about a tube to determine thickness of the tube.

U.S. Pat. No. 4,692,700 to Nix provides a probe for measurement of thickness of a moving strip or layer mounted upon the stri to enable measurement of material thickness based upon a generally elliptical magnetic circuit extending from the material being measured.

As such, it may be appreciated that there continues to be a need for a new and improved automotive body filler detection apparatus which addresses both the problems of ease of use, portability, and effectiveness in construction and in this respect, the present invention substantially fulfills this need.

SUMMARY OF THE INVENTION

In view of the foregoing disadvantages inherent in the known types of measuring apparatus now present in the prior art, the present invention provides an automotive body filler detection apparatus wherein the same utilizes an extensible and retractable post mounted within a housing, whereupon degree of extension of the post relative to the housing determines filler material thickness mounted within the body surface of an associated automobile. As such, the general purpose of the present invention, which will be described subsequently in greater detail, is to provide a new and improved automotive body filler detection apparatus which has all the advantages of the prior art detection apparatus and none of the disadvantages.

To attain this, the present invention includes apparatus for the detection of body filler components utilized in damage repair of automotive sheet metal is set forth. The device utilizes an elongate housing including a reciprocatable shaft mounted coaxially within the housing, wherein the reciprocatable shaft includes a forward terminal end mounting a magnet member thereon. Upon the magnet being retracted from a non-metallic or filled body surface utilizing various polymeric or even lead fillers, the shaft remains retracted in the housing biased therewithin. Intermediate levels of body filler effects various degrees of extension of the shaft relative to the housing wherein a stepped plate is provided to lock the shaft in its forwardmost extension relative to the housing.

My invention resides not in any one of these features per se, but rather in the particular combination of all of them herein disclosed and claimed and it is distinguished from the prior art in this particular combination of all of its structures for the functions specified.

. There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive body filler detection apparatus which has all the advantages of the prior art detection apparatus and none of the disadvantages.

It is another object of the present invention to provide a new and improved automotive body filler detection apparatus which may be easily and efficiently manufactured and marketed.

It is a further object of the present invention to provide a new and improved automotive body filler detection apparatus which is of a durable and reliable construction.

An even further object of the present invention is to provide a new and improved automotive body filler detection apparatus which is susceptible of a low cost of manufacture with regard to both materials and labor, and which accordingly is then susceptible of low prices of sale to the consuming public, thereby making such automotive body filler detection apparatus economically available to the buying public.

Still yet another object of the present invention is to provide a new and improved automotive body filler detection apparatus which provides in the apparatuses and methods of the prior art some of the advantages thereof, while simultaneously overcoming some of the disadvantages normally associated therewith.

Still another object of the present invention is to provide a new and improved automotive body filler detection apparatus wherein the same permits detection of various levels of body filler within an automotive metallic surface by directing a magnetic sensor across an associated automobile surface and permitting extension of a shaft mounting the magnet relative to a housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 an orthographic vieW, taken in elevation, of the instant invention.

FIG. 2 is an orthographic cross-sectional view of the instant invention.

FIG. 3 is an orthographic cross-sectional view of the instant invention with the reciprocatable shaft emitted therefrom.

FIG. 4 is an orthographic cross-sectional view somewhat exploded to illustrate the various components of the invention, their relationship, and relative configuration.

FIG. 7 is an orthographic side view, taken in elevation, illustrating the indicator needle mounted relative to the reset sleeve of the instant invention.

FIG. 8 is an orthographic side view, somewhat exploded, of the steped gauge plate utilized by the instant invention.

FIG. 9 is an orthographic view, taken in elevation, of the stepped gauge plate mounted upon its support.

FIG. 10 is an orthographic cross-sectional view of the housing illustrating the anchor mount for the lower spring utilized by the instant invention.

FIG. 11 is an orthographic side view, taken in elevation, of the lower spring mounted to its associated mount.

FIG. 12 is an orthographic frontal view illustrating the indicating needle mounted to the associated shaft.

DESCRIPTION OF THE PREFERRED EMBODIMENT

Figure 5:
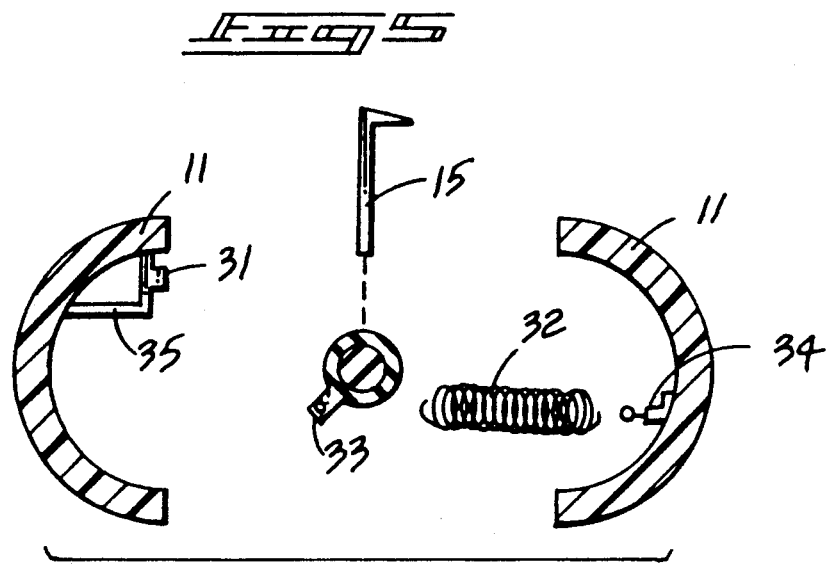
FIG. 5 is an orthographic cross-sectional view somewhat exploded of the indicator needle mounting relative to the housing of the instant invention.

With reference now to the drawings, and in particular to FIGS. 1 to 12 thereof, a new and improved automotive body filler detection apparatus embodying the principles and concepts of the present invention and generally designated by the reference numeral 10 will be described.

Figure 6:
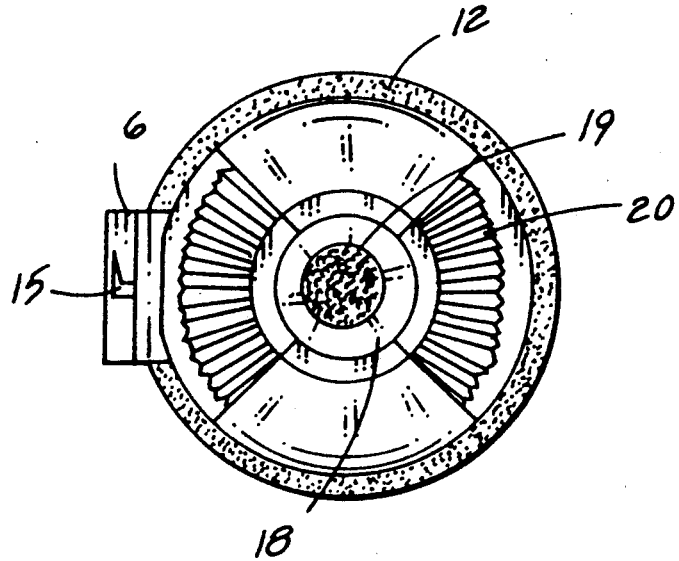
FIG. 6 is an orthographic top view of the instant invention.

More specifically, the automotive body filler detection apparatus 10 of the instant invention essentially comprises an elongate longitudinally aligned body 11 including a resilient handle sleeve 12 mounted in a surrounding relationship about a lower portion of the body. The body 11 includes a longitudinally aligned body slot 13 directed through the housing adjacent an upper terminal end thereof spaced above the sleeve 12. A gauge plate 14 is mounted in association with a reciprocatable indicator member or needle 15. The gauge plate 14 is mounted within a housing shield 36 for protection of the indicator member 15 in a manner as illustrated in FIGS. 6 and 7 for example. The indicator member 15 is integrally and orthogonally mounted to an elongate reciprocatable shaft 16. The shaft 16 includes an upper terminal end mounting a magnetic head support plate 17 thereon in a coaxially aligned relationship to the shaft with a permanent magnetic body 18 mounted on the support plate 18. A relatively thin fibrous tip 19 is mounted on the top surface of the magnetic body 18 to protect the automotive body surface as the magnetic body 18 is directed thereto. A reset dial 20 is integrally secured to and orthogonally and downwardly directed reset sleeve 27 and is mounted interiorly of the upper portion of the elongate body 11 underlying the body slot 13. A top alignment web 21 is mounted in cooperation with the reset dial 20 wherein in association with a bottom alignment web 21, provides a plurality of coaxially aligned apertures to slidably receive and direct the shaft 16 coaxially with the body 11. An abutment flange 23 integrally and orthogonally mounted adjacent a lower terminal end of the shaft 16 prevents removal or complete withdrawal of the shaft 16 relative to the housing 11. A lower return spring 24 mounted to the lower terminal end of the shaft 16 at an upper end of the spring 24 biases the shaft 16 within the housing 11 as the lower spring 24 is mounted at its lower end to an anchor mount 25 that in turn is mounted to a floor defined by the housing 11, wherein the floor is orthogonally mounted to the axis of the housing 11, as illustrated in FIG. 2 for example.

The support plate 17, the magnetic body 18, and the fibrous tip 19 define a gauge head 9 of a generally predetermined width that is receivable within a gauge head recess 26 defined by an equal predetermined width formed coaxially at the forward terminal end of the body 11 aligned therewith to receive the gauge head 9 in its retracted orientation within the housing. As noted above, the reset sleeve 27 is surroundingly formed and positioned about the shaft 16 to maintain the sleeve 27 in alignment therewith, and wherein the sleeve 27 is finite length to capture the sleeve and the associated reset dial 20 between the bottom web 22 and a conical recess receiving the reset dial 20.

A reset sleeve elongate slot 28 is formed longitudinally aligned with the sleeve 27 to slidably receive the indicator member 15 therethrough as the shaft 16 reciprocates within the housing 11. The sleeve elongate slot 28 is formed with a first slot side edge 29 spaced from and parallel to a second slot side edge 30, wherein the side edges are parallel relative to one another and of a predetermined width greater than that defined by the indicating member 15. The sleeve 27 is further formed by the reset sleeve biasing spring 32 that is mounted to a biasing spring sleeve mount 33 mounted adjacent a lower terminal end of the sleeve at one end with the biasing spring 32 mounted onto a housing mount 34 in alignment with the sleeve mount 33, wherein the housing mount 34 is mounted integrally to an interior surface of the housing 11 above and adjacent to the bottom web 22, as illustrated in FIG. 3 for example. The biasing spring 32 biases the second side edge 30 towards the indicating member 15 (see FIG. 12) to accordingly engage and bias indicating member 15 against a step of a multi-stepped gauge plate 31. The stepped gauge plate 31 is mounted upon a gauge plate support 35.

As the shaft 16 is extended relative to the housing 11, the indicator member 15 is captured within one of the steps of the multi-stepped gauge plate 31 to provide indication of relative magnetic attraction of an automotive body surface. To withdraw the indicating member 15 relative to the stepped gauge plate 31, the reset dial 20 is rotated whereupon the first slot side edge 29 (see FIG. 12) is directed against an opposing side of the indicating member 15 to withdrawn the indicating member from the stepped gauge plate. Upon release of the reset dial 20, the reset sleeve biasing spring 32 again permits impinging of the second slot side edge 30 against the indicator member 15 for a subsequent measurement of automotive body filler thickness relative to a metallic automotive body surface.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and eguivalents may be resorted to, falling within the scope of the invention.

What is claimed as being new and desired to be protected by Letters Patent of the U.S. is as follows:

1. An automotive body filler detection apparatus comprising,
    an elongate longitudinally aligned body, the body including a lower housing portion and an upper housing portion, the upper housing portion including a bottom web including a medial aperture directed through the bottom web defining a lower end of the upper body portion, and
    a top alignment web spaced coaxially above, including an upper body web aperture coaxially aligned with the medial aperture, and
    a reciprocatable shaft slidably received through the upper web aperture and the medial aperture, wherein the reciprocatable shaft includes an indicator member orthogonally and integrally mounted to the shaft and captured between the upper web and the bottom web, and
    magnetic means mounted to an upper terminal end of the reciprocatable shaft for traction to an automotive metallic body surface, and
    a biasing means mounted to a lower terminal end of the reciprocatable shaft to bias the reciprocatable shaft in a retracted position within the housing, and
    wherein the magnetic means includes a support plate mounted integrally and orthogonally relative to the upper terminal end of the reciprocatable shaft, and a permanent magnetic body mounted on the support plate, and a fibrous tip mounted overlying the magnetic body, wherein the fibrous tip, the magnetic body, and the support plate are coaxially aligned relative to one another and the reciprocatable shaft, and
    wherein the biasing means includes an elongate coil spring including a coil spring upper end mounted to the lower terminal end of the reciprocatable shaft, wherein the lower terminal end of the reciprocatable shaft is positioned below the bottom web, and an abutment plate is integrally and orthogonally mounted adjacent the lower terminal end of the reciprocatable shaft defined by a predetermined aperture to prevent the reciprocatable shaft and abutment plate from passage through the bottom web, and the coil spring including a spring lower end mounted to an anchor mount, wherein the anchor mount is mounted to a floor defined by the housing, the floor orthogonally and integrally mounted to a lower terminal end of the elongate body, wherein the biasing means is coaxially aligned with the housing and the reciprocatable shaft, and
    wherein a reset sleeve is captured between the upper web and the bottom web and is defined by a predetermined length equal to a length defined between the upper web and the bottom web, and the sleeve includes an elongate slot directed through the sleeve and coaxially aligned and offset relative to the reciprocatable shaft overlying the reciprocatable shaft and slidably receiving the indicator member therealong, the lot including a first slot side edge and a second slot side edge, the first and second slot side edges arranged parallel to one another to capture the indicator member therebetween.

2. An apparatus as set forth in claim 1 wherein the reset sleeve includes a spring means to rotatably bias the reset sleeve and the second side edge against the indicator member, and a reset dial integrally and orthogonally mounted to an upper terminal end of the reset sleeve to permit rotation of the reset sleeve to bias the first slot side edge against the indicator member.

3. An apparatus as set forth in claim 2 including a stepped gauge plate, the stepped gauge plate including an aligned series of steps thereon, the stepped gauge plate positioned overlying the elongate slot coaxially and coextensively formed relative tot he elongate slot wherein the indicator member is normally biased within the stepped gauge plate in a first position and is withdrawn from the stepped gauge plate in a second position when the reset dial is rotated relative to the housing.

4. An apparatus as set forth in claim 3 including a housing slot directed through the housing between the upper web and the bottom web receiving the indicator member therewithin, and a housing shield positioned about the housing slot to protect the indicator member from inadvertent damage wherein the gauge plate is aligned with the stepped gauge plate and coextensive therewith for indication of relative extension of the shaft and indicator member relative to the housing.

5. An apparatus as set forth in claim 4 wherein the spring means includes a forward spring end and a rear spring end, the forward spring end fixedly mounted to the reset sleeve adjacent a lower terminal end of the reset sleeve, and a sleeve mount integrally formed to the reset sleeve to receive the forward spring end therewithin, and the rear spring end received within a housing mount, the housing mount aligned with the sleeve mount and the housing mount fixedly mounte to an interior surface of the housing adjacent the bottom web.

6. An apparatus as set forth in claim 5 wherein the stepped gauge plate includes a gauge plate support, the gauge plate support integrally secured to an interior surface of the housing diametrically opposed to the housing mount and spaced above the reset sleeve to receive the indicator member within the stepped gauge plate.

* * * * *